United States Patent
Glomb et al.

(10) Patent No.: US 9,577,434 B2
(45) Date of Patent: Feb. 21, 2017

(54) METHODS AND APPARATUSES FOR ALLOCATING AMOUNTS OF ENERGY

(75) Inventors: Christian Glomb, Germering (DE); Jörg Heuer, Oberhaching (DE); Richard Kuntschke, Geisenhausen (DE); Martin Winter, Rosenheim (DE)

(73) Assignee: Siemens Aktiengesellschaft, München (DE)

( * ) Notice: Subject to any disclaimer, the term of this patent is extended or adjusted under 35 U.S.C. 154(b) by 523 days.

(21) Appl. No.: 14/129,107

(22) PCT Filed: May 30, 2012

(86) PCT No.: PCT/EP2012/060141
§ 371 (c)(1),
(2), (4) Date: Apr. 18, 2014

(87) PCT Pub. No.: WO2012/175297
PCT Pub. Date: Dec. 27, 2012

(65) Prior Publication Data
US 2014/0222235 A1    Aug. 7, 2014

(30) Foreign Application Priority Data
Jun. 24, 2011 (DE) .......... 10 2011 078 045

(51) Int. Cl.
*G05D 3/12* (2006.01)
*H02J 4/00* (2006.01)
(Continued)

(52) U.S. Cl.
CPC ............ *H02J 4/00* (2013.01); *G06Q 10/06* (2013.01); *G06Q 50/06* (2013.01)

(58) Field of Classification Search
CPC ........ H02J 2003/003; H02J 3/00; Y04S 10/54; Y04S 10/545; G05B 15/02; G05B 19/41865; G05B 2219/32021; Y02E 60/721; Y02E 10/566; Y02E 40/72; Y02E 60/74; Y02E 40/76
See application file for complete search history.

(56) References Cited

U.S. PATENT DOCUMENTS 6,278,899 B1 *  8/2001  Piche ................. G05B 17/02
                                          375/316
7,092,798 B2 *  8/2006  Mansingh ............. H02J 3/00
                                          700/286

(Continued)

OTHER PUBLICATIONS

German Office Action dated Feb. 23, 2012 for corresponding German Patent Application No. DE 10 2011 078 045.9 with English translation.

(Continued)

*Primary Examiner* — Darrin Dunn
(74) *Attorney, Agent, or Firm* — Lempia Summerfield Katz LLC (57) ABSTRACT

The present invention relates to methods and apparatuses for allocating amounts of energy for prosumers, wherein the prosumers provide minimum and maximum amounts of energy for a future interval of time and the respective amounts of energy from the prosumers are generated in such a manner that, on the one hand, a relative position of the amount of energy within an interval for the particular prosumer, as defined by the minimum amount of energy and the maximum amount of energy, assumes an identical value for all prosumers and, on the other hand, a sum of the amounts of energy from all prosumers produces a value of zero. The invention can be used in the distribution of amounts of energy in a power supply system having conventional energy producers and energy consumers as well as in novel participants in the power supply system which can both consume and provide energy, for example an electric vehicle.

16 Claims, 5 Drawing Sheets

(51) Int. Cl.
*G06Q 10/06* (2012.01)
*G06Q 50/06* (2012.01)

(56) References Cited

U.S. PATENT DOCUMENTS

| | | | | |
|---|---|---|---|---|
| 7,321,810 B2 * | 1/2008 | Mansingh | ............... | H02J 3/00 324/76.11 |
| 7,660,640 B2 * | 2/2010 | Chen | ............... | H02J 3/00 700/16 |
| 7,957,845 B2 * | 6/2011 | Chen | ............... | H02J 3/00 700/14 |
| 8,892,264 B2 * | 11/2014 | Steven | ............... | G06Q 50/06 700/286 |
| 9,098,876 B2 * | 8/2015 | Steven | ............... | G06Q 30/0283 |
| 2004/0257059 A1 * | 12/2004 | Mansingh | ............... | H02J 3/00 324/76.11 |
| 2004/0260489 A1 * | 12/2004 | Mansingh | ............... | G06Q 50/06 702/60 |
| 2005/0125104 A1 | 6/2005 | Wilson et al. | | |
| 2006/0041405 A1 * | 2/2006 | Chen | ............... | H02J 3/06 703/2 |
| 2007/0213878 A1 * | 9/2007 | Chen | ............... | H02J 3/00 700/291 |
| 2009/0326724 A1 | 12/2009 | Lasseter et al. | | |
| 2010/0306097 A1 * | 12/2010 | Greiner | ............... | G06Q 40/04 705/37 |
| 2011/0137482 A1 * | 6/2011 | Toba | ............... | H02J 3/46 700/291 |
| 2011/0208365 A1 * | 8/2011 | Miller | ............... | G06Q 50/06 700/291 |
| 2011/0231028 A1 * | 9/2011 | Ozog | ............... | G06Q 10/06 700/291 |
| 2011/0257803 A1 * | 10/2011 | Yamamoto | ............... | G06F 1/263 700/291 |
| 2011/0282500 A1 * | 11/2011 | Long | ............... | G05B 17/02 700/287 |
| 2011/0307109 A1 * | 12/2011 | Sri-Jayantha | ............... | G06Q 10/04 700/291 |
| 2012/0029720 A1 * | 2/2012 | Cherian | ............... | H02J 13/00 700/297 |
| 2012/0065792 A1 * | 3/2012 | Yonezawa | ............... | H02J 3/14 700/291 |
| 2012/0083933 A1 * | 4/2012 | Subbu | ............... | G06N 3/02 700/291 |
| 2012/0185106 A1 * | 7/2012 | Ghosh | ............... | G06Q 10/04 700/291 |
| 2012/0253532 A1 * | 10/2012 | McMullin | ............... | G06Q 50/06 700/291 |

OTHER PUBLICATIONS

PCT International Search Report and Written Opinion of the International Searching Authority dated Aug. 28, 2012 for corresponding PCT International Application No. PCT/EP2012/060141 with English translation.

European Office Action cited in European Application No. 12 730 167.9-1955, dated Nov. 24, 2014.

European Office Action cited in European Application No. 12 730 167.9-1955, dated Nov. 24, 2014 with English translation.

* cited by examiner

FIG 2

|      | i=1<br>P1 | i=2<br>P2 | i=3<br>P3 | i=4<br>P4 | i=5<br>P5 |
|------|-----|-----|-----|-----|-----|
| ENi  | -10 | -80 | 10  | 50  | 10  |
| EXi  | 20  | -70 | 50  | 60  | 20  |
| ED2i | 30  | 10  | 40  | 10  | 10  |
| EFi  | 0,3 | 0,1 | 0,4 | 0,1 | 0,1 |
| Ei   | -4  | -78 | 18  | 52  | 12  |

METHODS AND APPARATUSES FOR ALLOCATING AMOUNTS OF ENERGY

The present application is a §371 nationalization of PCT Application No. PCT/EP2012/060141, filed May 30, 2012, and designating the United States, which, in turn, claims the benefit of DE 102011078045.9, filed on Jun. 24, 2011, the entire disclosures of which are incorporated by reference herein.

BACKGROUND

The present embodiments relate to methods and devices for allocating amounts of energy for prosumers in an electric grid.

The progressive expansion of renewable energies is leading to an increasing decentralization of power generation. In addition, it is becoming increasingly more difficult to forecast an amount of energy to be expected or to be generated because of potentially larger fluctuations in energy in the case of renewable energies (e.g., because of weather dependence).

This change may be taken into account by introducing smart electric grids that have in addition to the actual electric grid a communication network for exchanging information and for controlling decentral units. Power generation and power consumption may thus be regulated within certain limits by appropriately smart generators and consumers connected to the communication network. This is accompanied by an increasing complexity in the balancing of power generation and power consumption in the electric grids. The control of this complexity, and the suitable balancing of power generation and power consumption are a precondition for meeting the energy requirements of the consumers in the grid, and for providing grid stability.

In addition to the traditional power generators and power consumers, there are also new types of participants in the electric grid that may store the energy and also output the energy such as, for example, electric cars. These traditional power generators and consumers and new types of participants are referred to as prosumers. The new types of participants may absorb energy into their batteries at night when there is mostly an excess of energy, and output the energy again at peak times (e.g., in the morning between 6:00 and 9:00).

SUMMARY AND DESCRIPTION

The scope of the present invention is defined solely by the appended claims and is not affected to any degree by the statements within this summary.

The present embodiments may obviate one or more of the drawbacks or limitations in the related art. For example, methods and devices for allocating amounts of energy that facilitate adaptation of power consumption and power generation in an electric grid and enable the allocation of the amounts of energy per prosumer are provided.

In one embodiment, a method for allocating an amount of energy per prosumer includes determining a maximum amount of energy and a minimum amount of energy for each prosumer. The method also includes generating the respective amount of energy such that a relative position of the amount of energy is produced within an interval, defined by the minimum amount of energy and the maximum amount of energy, of the respective prosumer such that the relative positions of the prosumers assume an identical value. The respective amount of energy is also generated such that a sum of the amounts of energy yields a value of zero.

"Prosumer"—may be a power generator that provides only energy in an electric grid, a power consumer that consumes only energy from an electric grid, and a new type of participant that may both store energy and output energy.

One or more of the present embodiments are advantageous because amounts of energy are considered instead of power values. This permits an inherent imaging with an account of storage capacities at the prosumers. In addition to controllable generators and consumers, it is the responsibility of storage capacities that the minimum amounts of energy to be drawn do indeed turn out to be lower than the maximum amounts of energy that may be drawn.

This provides that when energy is being allocated, each prosumer has a margin that the prosumer may utilize in the context of allocating the amounts of energy to the prosumers. The consideration of minimum and maximum amounts of energy per prosumer dictates for each prosumer the definition of a band of amounts of energy. The amount of energy actually allocated to the respective prosumer is to fall within this band of amounts of energy.

In order to provide that the amounts of energy are adjusted between consumption and generation, the sum of the amounts of energy is to yield a value of zero over all prosumers after allocation. The electric grid is balanced in this state, and there is no oversupply or undersupply of energy.

Generating the respective amount of energy such that a relative position of the amount of energy within an interval, defined by the minimum amount of energy and the maximum amount of energy, of the respective prosumer assumes an identical value for all prosumers provides that each prosumer is treated identically by comparison with other prosumers. The result of this is that none of the prosumers respectively receives an amount of energy that corresponds either to a maximum or to a minimum amount of energy of the prosumer. Consequently, capacities that the prosumers may equalize by absorbing or outputting energy are available for short-term fluctuations in the electric grid. However, this conclusion is valid only for prosumers having minimum and maximum amounts of energy that are unequal.

The following acts are carried out in a first embodiment of the method. A maximum total amount of energy is generated by summing the maximum amounts of energy, and a minimum total amount of energy is generated by summing the minimum amounts of energy. A first amount of energy is generated by forming the difference between the maximum total amount of energy and the minimum total amount of energy. A respective second amount of energy is generated per prosumer by forming the difference between the respective maximum amount of energy and the respective minimum amount of energy. An energy factor is generated per prosumer by multiplying the respective second amount of energy by the reciprocal of the first amount of energy, and the respective amount of energy is generated by adding the respective minimum amount of energy and the product of an absolute value of the minimum total amount of energy and the respective energy factor.

These acts describe a first embodiment of the method considering intervals of the prosumers defined by the respective minimum and maximum amounts of energy. These acts are characterized by a simple and cost-effective ability to be executed.

The following acts are carried out in a second alternative variant embodiment. A maximum total amount of energy is generated by summing the maximum amounts of energy. A minimum total amount of energy is generated by summing the minimum amounts of energy. An energy ratio is generated by multiplying the maximum total amount of energy by the reciprocal of the minimum total amount of energy. An intermediate value per prosumer is generated by subtracting a product of the energy ratio and the respective minimum amount of energy from the respective maximum amount of energy. The respective amount of energy per prosumer is generated by multiplying the respective intermediate value by the reciprocal of a subtraction of the energy ratio from a value of one.

These acts describe a second alternative exemplary embodiment of the method. In this case, the respective amounts of energy are determined with the aid of the energy ratio by multiplying the maximum total amount of energy by the reciprocal of the minimum total amount of energy. This second alternative exemplary embodiment is also distinguished by a simple ability to be implemented and executed.

In a development of the method, the allocation of the amounts of energy is respectively carried out for a future time interval. It is thereby provided that changes in the behavior of the prosumer may be taken account of, and thus an optimization of a provision of amounts of energy may be taken account of. In addition, the stability of the entire grid is thereby improved, since fluctuations in the power generation and power consumption may be reacted to.

In a development, a length of the future time interval is set equidistantly. A simple applicability of the method is thereby provided for future time intervals.

As an alternative to this, the length of the future time interval may be set such that in the case of an increase in a difference between maximum and minimum total amounts of energy of a current time interval and a difference between maximum and minimum total amounts of energy of a time interval earlier than the current time interval, the length of the future time interval is dynamically adapted (e.g., shortened) by a comparison of the length of the current time interval.

As a result, in the event of a drifting apart from one another of the minimum and maximum total amounts of energy, which indicates, for example, a relatively high uncertainty in a prediction of the power consumption to be expected, the future time interval for which the amounts of energy of the prosumer are to be fixed is changed (e.g., shortened). The result of this is an improved balancing of the allocation of the amounts of energy, and thus also an improved stability of the electric grid.

The following acts are carried out in a development. A cost function is assigned per prosumer. The respective cost function specifies costs for values of the amounts of energy within the minimum amount of energy and the maximum amount of energy of the respective prosumer. A first and second agent are selected from the set of the prosumers such that the cost function of the first agent has a slope of maximum absolute value, and the cost function of the second agent has a slope of minimum absolute value. The maximum and the minimum slope refer respectively to a slope of the respective cost functions in the amount of energy associated with the agent. New amounts of energy of the first and second agents are generated such that a differential value between the respective amount of energy and the respective new amount of energy of the first agent becomes identical to a differential value between the respective new amount of energy and the respective amount of energy of the second agent. The new amounts of energy of the first and second agents are respectively selected within the minimum amount of energy associated with the first and second agents and the associated maximum amount of energy. A sum of the respective costs of the new amounts of energy is smaller than a sum of the respective costs of the amounts of energy of the first and second agents.

A cost reduction in the allocation of amounts of energy of the prosumers under consideration is achieved by this development. The allocated amount of energy of a prosumer who registers a high cost increase in the event of a rise in an amount of energy is reduced in this case. In order to keep the power consumption balanced out in relation to power generation in the electric grid (i.e., the sum of the amounts of energy over all prosumers is zero), the reduced amount of energy is made available to another prosumer. The increase in the amount of energy causes a slight cost increase for the other prosumer. A local displacement of the allocated amounts of energy thereby takes place, but the consumption of the amount of energy is still balanced out against the generation of the amount of energy. In addition, the costs in the overall electric grid may be reduced.

This development may be supplemented by replacing the amounts of energy of the prosumers represented by the first and second agents by the new amounts of energy (E1W, E2W) and repeating the acts of the previous development. Cost optimization in the allocation of amounts of energy may thus be provided in a heuristic way.

One or more of the present embodiments relate to a device for allocating an amount of energy per prosumer. The device includes a first unit for determining a maximum amount of energy and a minimum amount of energy for each prosumer. The device also includes a second unit for generating the respective amount of energy such that a relative position of the amount of energy is produced within an interval, defined by the minimum amount of energy and the maximum amount of energy, of the respective prosumer such that the relative positions of the prosumers assume an identical value, and a sum of the amounts of energy yields a value of zero.

The method may thus be implemented and executed in accordance with the previously described advantages. Further units may implement and execute developments.

DETAILED DESCRIPTION

Elements having the same function and mode of operation are provided with the same reference symbols in the figures.

Figure 1:
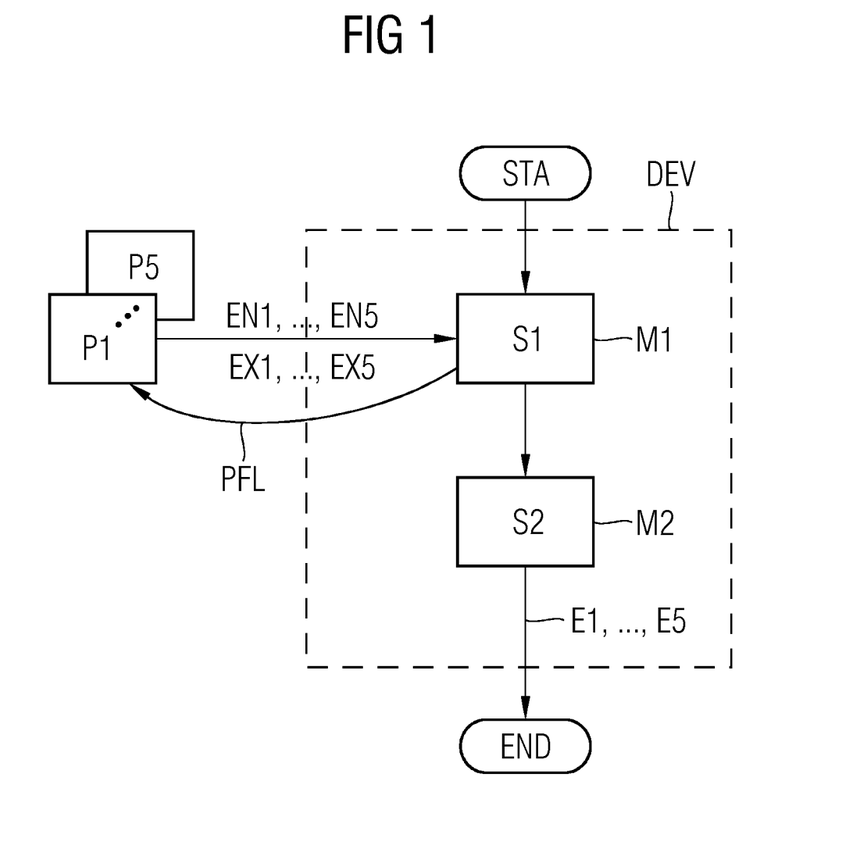
FIG. 1 shows a flowchart and the structure of a device for carrying out the method in a first variant.

FIG. 1 shows a flowchart for carrying out one embodiment of a method for allocating amounts of energy.

Figure 2:
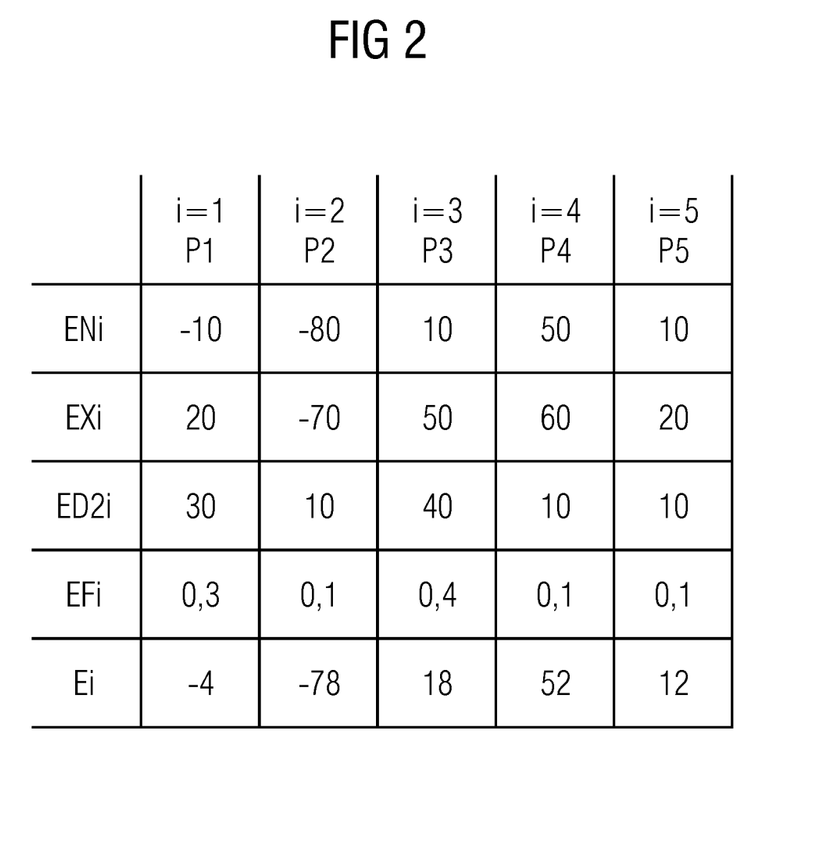
FIG. 2 shows an overview of various amounts of energy for an exemplary embodiment.

By way of example, in act S1, prosumers P1, . . . , P5 use a central unit to request respective minimum amounts of energy EN1, . . . , EN5 and maximum amounts of energy EX1, . . . , EX5 (see arrow PFL). The respective minimum and maximum amounts of energy per prosumer in an example are shown in FIG. 2.

In general, the maximum amount of energy defines an amount of energy that a prosumer may consume the most in a time interval or may minimally produce. In a way similar thereto, the minimum amount of energy defines an amount of energy that a prosumer may consume the least in a time interval or may maximally produce. Negative values of amounts of energy are available in FIG. 2 for providing amounts of energy, and positive values of amounts of energy are available for consuming amounts of energy. In general, negative values may also be used for consumption together with positive values for production.

In act S2, the respective amounts of energy E1, ..., E5 are generated such that a relative position R1, ..., R5 of the amount of energy within a time interval, defined by the minimum amount of energy and the maximum amount of energy, of the respective prosumer assumes an identical value for all prosumers, and a sum of the amounts of energy yields a value of 0. Special embodiments of the act S2 are illustrated below with the aid of two variant embodiments.

After provision of the respective amounts of energy, the state diagram is terminated in the END state.

Figure 3:
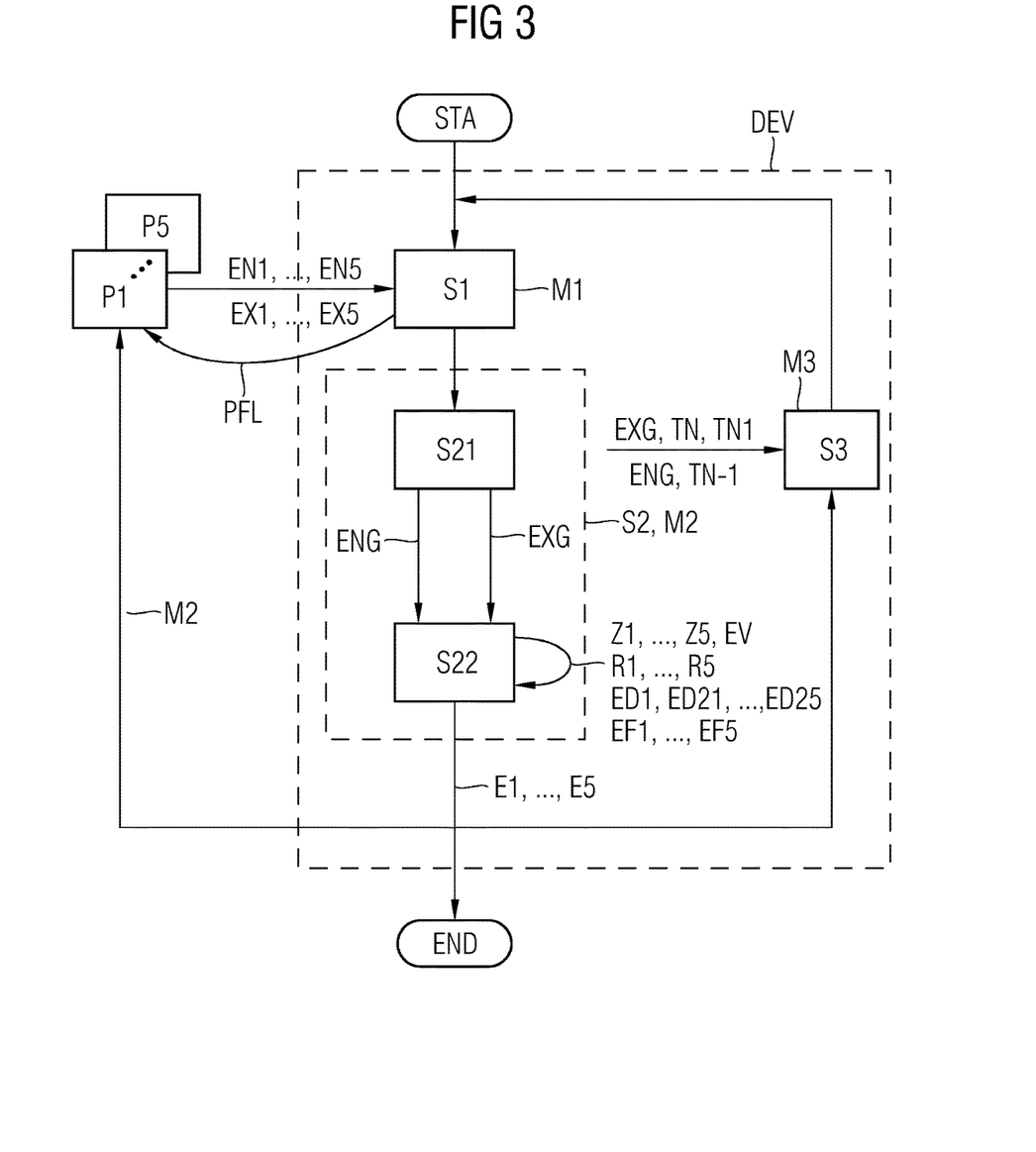
FIG. 3 shows a flowchart and the structure of a device for carrying out the method in a second variant.

The method is explained in more detail below with the aid of a first exemplary embodiment. For example, in this case, there is an examination of processing acts S21, S22 that, in FIG. 1, are sub-acts of the act S2. FIG. 3 shows these processing acts.

FIG. 2 shows the minimum amounts of energy and maximum amounts of energy per prosumer. The amounts of energy are specified, for example, in kilowatt hours (kWh). Positive values correspond, for example, to an energy consumption, while negative values correspond to provision of energy (i.e., power production).

For example, the fifth prosumer P5 with i=5 specifies EN5=10 as minimum amount of energy, and EX5=20 as maximum amount of energy. The fifth prosumer is a pure power consumer.

The second prosumer P2 is a pure power generator that may provide amounts of energy in the interval EN5=−80 to EX5=−70.

Particular reference is made to the first prosumer P1, which specifies EN1=−10 as minimum amount of energy, and EX5=10 as maximum amount of energy. This provides that the first prosumer may supply energy as well as to consume energy.

The prosumer is, for example, an electric car that stores energy via a battery, or may output the energy.

The maximum total amount of energy EXG is calculated by summing the respective maximum amounts of energy EXi to be $$EXG = \sum_i EXi.$$

EXG=80 in the example in accordance with FIG. 2.

The minimum total amount of energy ENG is calculated by summation of the minimum amounts of energy as $$ENG = \sum_i ENi.$$

ENG=−20 for the example in accordance with FIG. 2.

The formation of the minimum and maximum amounts of energy is carried out by the sub-act S21. Further acts of the first or second exemplary embodiment may be accomplished by the sub-act S22.

A first amount of energy ED1 is formed by forming the difference between the maximum total amount of energy EXG and the minimum total amount of energy ENG (i.e., by ED1=EXG−ENG=100).

In what follows, a second amount of energy ED21, ..., ED25 is produced for each prosumer by forming the difference between the respective maximum amount of energy EX1, ..., EX5 and the respective minimum amount of energy EN1, ..., EN5 (e.g., ED21=EX1−EN1). The respective second amounts of energy are plotted in FIG. 2 for the computational example.

An energy factor EF1, ... EF5 is formed per prosumer by multiplying the respective second amount of energy ED2i by the reciprocal of the first amounts of energy ED1. By way of example, this provides for the third prosumer P3 that EF3=ED23/ED1=40/100=0.40. A further row in FIG. 2 reproduces the values for the respective energy factor.

In a further processing act, the respective amounts of energy E1, ..., E5 are formed by adding the respective minimum amount of energy and the product of an absolute value of the minimum total amount of energy and the respective energy factor.

The computational formula for this act is therefore:

$$Ei = ENi + |ENG| \cdot EFi = ENi - ENG \cdot EFi$$

The resolution of the absolute value results from the fact that the minimum total amount of energy is always negative or zero, since otherwise, equilibrium would not be possible between power consumption and power generation.

The sum of the determined energy values E1, ..., E5 is zero. The supply and demand for amounts of energy are therefore balanced out.

In an alternative second exemplary embodiment, the following subacts are run through in this regard (see FIG. 3).

An energy ratio EV is generated by multiplying the maximum total amount of energy EXG by the reciprocal of the minimum amount of energy ENG. In other words $$EV = \frac{EXG}{ENG}.$$

EV=80/(−20)=−4 in the present example.

Intermediate values Z1, ..., Z5 per prosumer are generated by subtracting a product of the energy ratio EV and the respective minimum amount of energy from the respective maximum amount of energy per prosumer. In other words, $$Zi = EXi - EV \cdot ENi = EXi - \frac{EXG \cdot ENi}{ENG}$$

For example, Z2=−70−(80*(−80))/(−20)=−70−640/20=−390 for the second prosumer.

The respective amount of energy per prosumer is formed by multiplying the respective intermediate value by the reciprocal of the subtraction of the energy ratio EV from a value of 1. This provides that $$Ei = \frac{Zi}{(1 - EV)},$$

For example, E2=−390/(1−(−4))=−78 for the second prosumer.

The generated amounts of energy E1, ..., E5 may be reported back to the prosumers so that the prosumers have, in a time interval to come, the amounts of energy to be consumed or to be provided.

In a development of the method, a length of a future time interval TN may be set (see act S3 in FIG. 3). The length of the future time interval may be equidistant in this case. As an alternative thereto, in the case of an increase in a difference between the maximum and minimum total energy of a current time interval TN by comparison with a difference between a maximum and minimum total amount of energy of a time interval TN−1 earlier than the current time interval, the length of the future time interval may be dynamically adapted (e.g., shortened).

The following illustration shows a minimum and maximum total amount of energy ENG, EXG in kWh for the earlier, current and future time interval, the respective difference EXG-ENG and the length of the respective time interval in ms:

|      | ENG | EXG | Difference | Length |
|------|-----|-----|------------|--------|
| TN−1 | −20 | 100 | 120        |        |
| TN   | −40 | 100 | 140        | 55     |
| TN1  |     |     |            | 50     |

In this example, the difference increases such that the future time interval is shortened to 50 ms instead of the current 55 ms.

As a result of this adaptivity of the time interval, the allocation of the respective amounts of energy per prosumer may be adapted to current conditions in the electric grid. In the case of a decrease in the difference between a maximum and minimum total amount of energy between two consecutive time intervals, the result is the closure of a relatively unstable electric grid of lesser flexibility at the individual prosumers with regard to the possibility that the individual prosumers may supply or absorb energy. The use of a relatively short future time interval may effect a stabilization of the electric grid.

Figure 4:
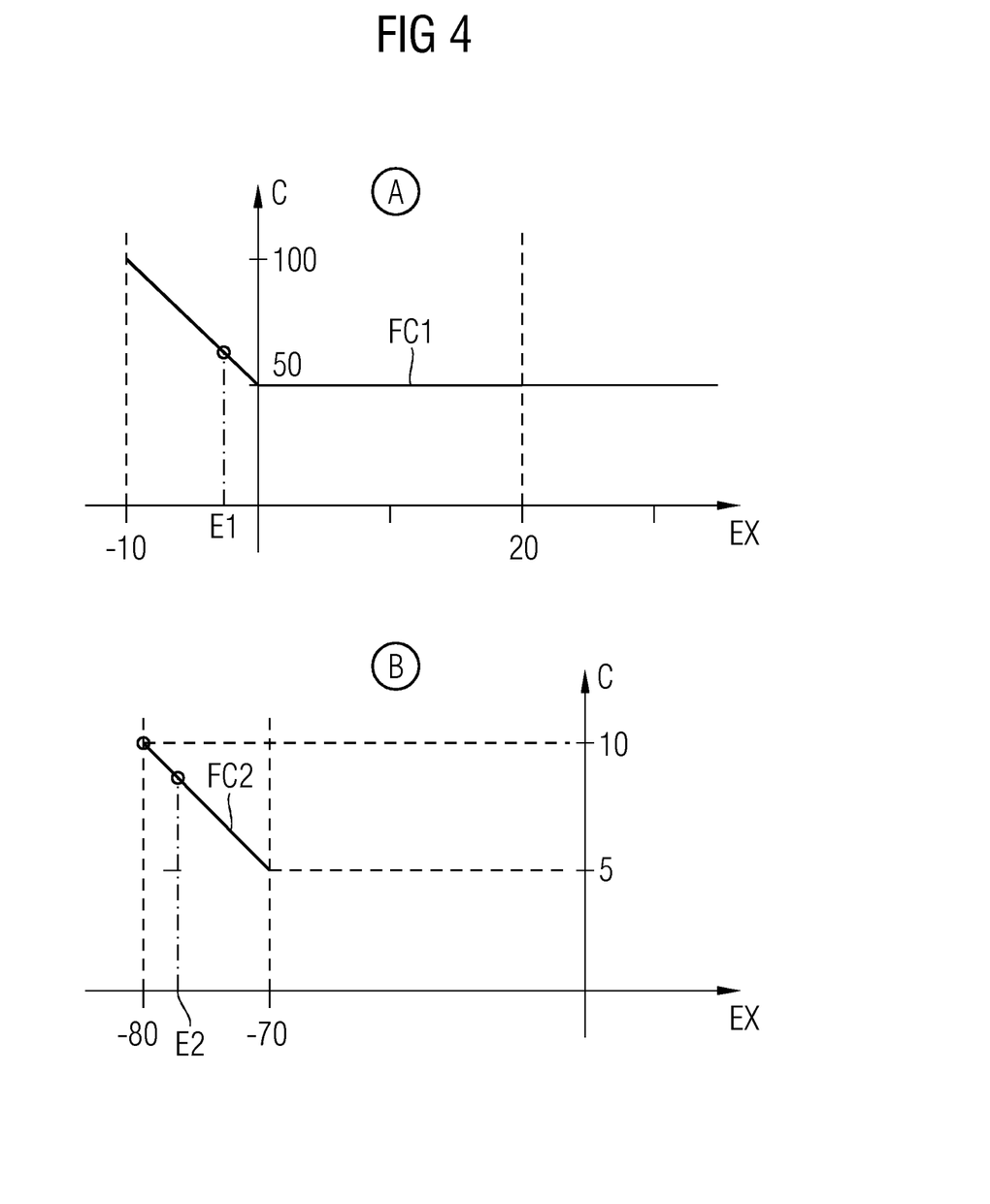
FIG. 4 shows cost functions for illustrating the costs per respective value of the amount of energy.
Figure 5:
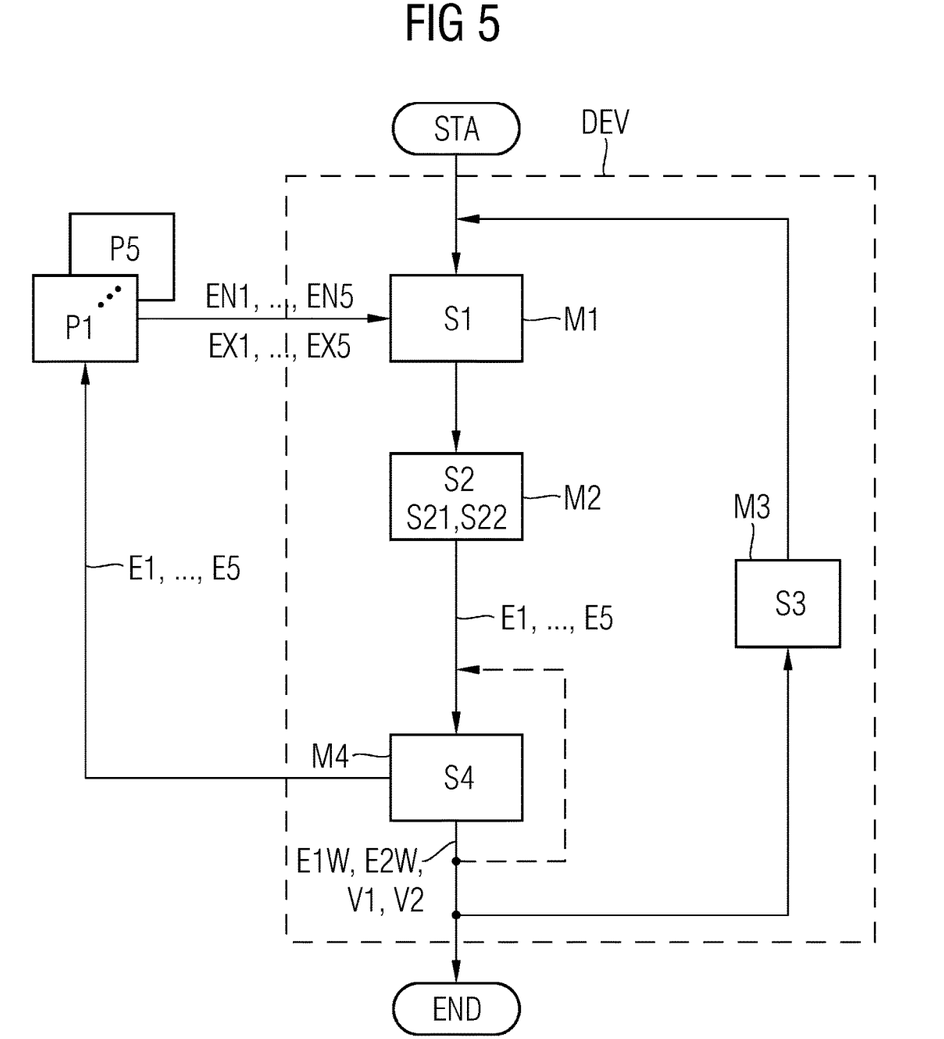
FIG. 5 shows a flowchart and the structure of a device for carrying out the method in a third variant.

A development of the method using cost functions FC1, ..., FC5 is illustrated with the aid of FIG. 4. This development is also shown in FIG. 5, which shows this development by comparison with FIG. 3 in act S4. A cost function FCi (e.g., FC1 for the prosumer P1) specifies costs C (e.g., in euros) that arise in the event of the provision or consumption of amounts of energy. Since the individual prosumers prescribe bands of the amounts of energy that have a maximum and minimum amount of energy, the determination of the amounts of energy for a future time interval may also take account of the cost function.

FIG. 4 shows, in partial figure (A), a cost function for the prosumer P1 that decreases linearly from (−10; 100) to (0; 50) and then continues to fall linearly from (0; 50) to (20; 45). In this description, the first number of the respective number pair EX thus represents a value of the amount of energy, and the second number of the respective number pair C thus represents the costs for a specific value of an amount of energy. The first prosumer P1 may both supply and absorb amounts of energy. However, the costs for supplying amounts of energy are very high because, for example, when amounts of energy are stored, more energy is to be absorbed than may later be supplied. Thus, a slope in the costs C between the values of the amounts of energy −10<EX<0 is greater in absolute value than in the range of the values of amounts of energy 0<EX<20. In accordance with the exemplary embodiment (see FIG. 2), E1=−4 was assigned as the amount of energy to the first prosumer. This results in the costs C=70.

In partial figure (B) of FIG. 4, a cost function is illustrated for the second prosumer P2. The prosumer P2 is a pure power generator that supplies amounts of energy in the band of amounts of energy from −80 to −70. Within this band, the cost function FC2 decreases linearly and runs from (−80; 10) to (−70; 5). By applying the exemplary embodiment in accordance with FIG. 2, the prosumer P2 has so far been assigned an amount of energy of E3=−78. This corresponds to the costs of C=9.

From all the prosumers, the one prosumer having a cost function that has the steepest slope in absolute terms in the associated amount of energy is selected. This is the case for the first prosumer, which is therefore denoted below as first agent V1. In addition, the one prosumer having a cost function that has the shallowest slope in absolute terms in the associated amount of energy is selected from all the prosumer. This is the case for the second prosumer, which is therefore denoted below as second agent V2.

The next act is to determine new amounts of energy E1W and E2W for the first and second agents V1, V2. For example, the new amounts of energy are E1W=−2 for the first agent V1, and the new amounts of energy are E2W=−80 for the second agent V2. The following conditions are to be simultaneously met when fixing the new amounts of energy.

A first difference value, formed by subtracting the amount of energy E1 from the new amount of energy E1W, with reference in each case to the first agent, is to be identical to a second difference value formed by subtracting the new amount of energy E2W from the amount of energy E2, with reference in each case to the second agent. In the above example, $E1W-E1=-2-(-4)=2$ and $E2-E2W=-78-(-80)=2$.

The new amounts of energy E1W, E2W is to respectively lie within the bands of the amounts of energy defined by the minimum and maximum amounts of energy of the respective agents. The term "within" may also be that the new amounts of energy may also be minimum or maximum amounts of energy. This is fulfilled for the new amounts of energy in accordance with the present example.

$E1W: -10<=-2<=20$ $E2W: -80<=-80<=-70$.

(the symbol "<=" means smaller than or equal to)

A sum of the respective costs of the new amounts of energy is smaller than a sum of the respective costs of the amounts of energy of the first and second agents.

Sum of the costs of the new amounts of energy:

$FC1(-2)+FC2(-80)=60+10=70$

Sum of the costs of the amounts of energy (costs to date):

$FC1(-4)+FC2(-78)=70+8=78$

This condition is therefore fulfilled.

In a development in this regard, the amounts of energy are replaced by the new amounts of energy of the respective prosumers. The acts of selecting the agents, and the calculation of new amounts of energy for further prosumers are repeated iteratively until either there is a lasting improvement under prescribable savings in costs, or until no two prosumers that fulfill the conditions are found. FIG. 5 shows this development by a dashed arrow around act S4.

The methods presented and the associated developments may be executed by a device DEV, a first unit M1 being capable of implementing and executing act S1, a second unit M2 likewise for the act S2, a third unit M3 likewise for the act S3, and a fourth unit M4 likewise for the act S4. The second unit M2 is configured such that the specific method acts S21, S22 of the two alternative variant embodiments may be implemented and executed. The units M1, . . . , M4 may be implemented as software, hardware or in a combination of software and hardware. For example, a processor executes the acts S1 to S4 stored in a memory connected to the processor. The processor has an input and output interface with which the minimum and maximum amounts of energy may be requested by the prosumers, and the determined amounts of energy E1, . . . , E5 may be made available to the prosumers for a future time interval. Intermediate results of the individual processing acts, such as a minimum and maximum total amount of energy or the cost functions FC1, . . . , FC5, may also be stored in the memory. In addition, the units M1 to M4 may also be implemented by permanently wiring electronic components to a memory module.

The developments may be combined at will in the context of the methods or the devices.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for allocating an amount of energy per prosumer, the method comprising:
determining a maximum amount of energy and a minimum amount of energy for each prosumer;
generating a maximum total amount of energy, the generating of the maximum total amount of energy comprising summing the maximum amounts of energy for each prosumer;
generating a minimum total amount of energy, the generating of the minimum total amount of energy comprising summing the minimum amounts of energy for each prosumer;
generating a first amount of energy, the generating of the first amount of energy comprising forming a difference between the maximum total amount of energy and the minimum total amount of energy;
generating a respective second amount of energy per prosumer, the generating of the respective second amount of energy per prosumer comprising forming a difference between a respective maximum amount of energy and a respective minimum amount of energy;
generating an energy factor per prosumer, the generating of the energy factor per prosumer comprising multiplying the respective second amount of energy by a reciprocal of the first amount of energy;
generating a respective amount of energy, the generating of the respective amount of energy comprising adding the respective minimum amount of energy and a product of an absolute value of the minimum total amount of energy and the respective energy factor, such that:
a relative position of the respective amount of energy is produced within an interval, defined by the minimum amount of energy and the maximum amount of energy, of the respective prosumer such that the relative positions of each of the prosumers have an identical value; and
a sum of the respective amounts of energy for each prosumer yields a value of zero.

2. The method of claim 1, wherein the allocation of the amounts of energy is respectively carried out for a future time interval.

3. The method of claim 2, wherein a length of the future time interval is set equidistantly.

4. The method of claim 2, wherein a length of the future time interval is set such that in the case of an increase in a difference between the maximum total amount of energy and the minimum total amount of energy of a current time interval and a difference between the maximum total amount of energy and the minimum total amount of energy of a time interval earlier than the current time interval, the length of the future time interval is dynamically adapted by a comparison of the length of the current time interval.

5. The method of claim 4, further comprising:
assigning a cost function per prosumer, the respective cost function specifying costs for values of the amounts of energy within the minimum amount of energy and the maximum amount of energy of the respective prosumer;
selecting a first agent and a second agent from the prosumers such that the cost function of the first agent has a slope of maximum absolute value, and the cost function of the second agent has a slope of minimum absolute value, the slope of maximum absolute value and the slope of minimum absolute value referring respectively to a slope of the respective cost functions in the amount of energy associated with the agent; and
generating new amounts of energy of the first agent and the second agent such that:
a differential value between the respective amount of energy and the respective new amount of energy of the first agent becomes identical to a differential value between the respective new amount of energy and the respective amount of energy of the second agent;
the new amounts of energy of the first agent and the second agent are respectively selected within the minimum amount of energy associated with the first agent and second agent and the associated maximum amount of energy; and
a sum of the respective costs of the new amounts of energy is smaller than a sum of the respective costs of the amounts of energy of the first agent and second agent.

6. The method of claim 5, wherein the amounts of energy of the prosumers represented by the first agent and the second agent are replaced by the new amounts of energy; and
wherein the setting of the length of the future time interval is repeated.

7. A device for allocating an amount of energy per prosumer, the device comprising:

a processor configured to:
  determine a maximum amount of energy and a minimum amount of energy for each prosumer; and
  generate a maximum total amount of energy, the generation of the maximum total amount of energy comprising a sum of the maximum amounts of energy for each prosumer;
  generate a minimum total amount of energy, the generation of the minimum total amount of energy comprising a sum of the minimum amounts of energy for each prosumer;
  generate a first amount of energy, the generation of the first amount of energy comprising formation of a difference between the maximum total amount of energy and the minimum total amount of energy;
  generate a respective second amount of energy per prosumer, the generation of the respective second amount of energy per prosumer comprising formation of a difference between a respective maximum amount of energy and a respective minimum amount of energy;
  generate an energy factor per prosumer, the generation of the energy factor per prosumer comprising multiplication of the respective second amount of energy by a reciprocal of the first amount of energy;
  generate a respective amount of energy, the generation of the respective amount of energy comprising addition of the respective minimum amount of energy and a product of an absolute value of the minimum total amount of energy and the respective energy factor, such that:
    a relative position of the respective amount of energy for each prosumer is produced within an interval, defined by the minimum amount of energy and the maximum amount of energy, of the respective prosumer that the relative positions of the prosumers have an identical value; and
    a sum of the amounts of energy yields a value of zero.

8. The method of claim 4, wherein the length of the future time interval is set such that in the case of the increase in the difference between the maximum total amount of energy and the minimum total amount of energy of the current time interval and the difference between the maximum total amount of energy and the minimum total amount of energy of the time interval earlier than the current time interval, the length of the future time interval is shortened by the comparison of the length of the current time interval.

9. A method for allocating an amount of energy per prosumer, the method comprising:
  determining a maximum amount of energy and a minimum amount of energy for each prosumer;
  generating a maximum total amount of energy, the generating of the maximum total amount of energy comprising summing the maximum amounts of energy;
  generating a minimum total amount of energy, the generating of the minimum total amount of energy comprising summing the minimum amounts of energy;
  generating an energy ratio, the generating of the energy ratio comprising multiplying the maximum total amount of energy by the reciprocal of the minimum total amount of energy;
  generating an intermediate value per prosumer, the generating of the intermediate value per prosumer comprising subtracting a product of the energy ratio and the respective minimum amount of energy from the respective maximum amount of energy; and
  generating the respective amount of energy per prosumer, the generating of the respective amount of energy per prosumer comprising multiplying the respective intermediate value by a reciprocal of a subtraction of the energy ratio from a value of one, such that:
    a relative position of the respective amount of energy is produced within an interval, defined by the minimum amount of energy and the maximum amount of energy, of the respective prosumer such that the relative positions of each of the prosumers have an identical value; and
    a sum of the respective amounts of energy for each prosumer yields a value of zero.

10. The method of claim 9, wherein the allocation of the amounts of energy is respectively carried out for a future time interval.

11. The method of claim 10, wherein a length of the future time interval is set equidistantly.

12. The method of claim 10, wherein a length of the future time interval is set such that in the case of an increase in a difference between the maximum total amount of energy and the minimum total amount of energy of a current time interval and a difference between the maximum total amount of energy and the minimum total amount of energy of a time interval earlier than the current time interval, the length of the future time interval is dynamically adapted by a comparison of the length of the current time interval.

13. A device for allocating an amount of energy per prosumer, the device comprising:
  a processor configured to:
  determine a maximum amount of energy and a minimum amount of energy for each prosumer;
  generate a maximum total amount of energy, the generation of the maximum total amount of energy comprising a sum of the maximum amounts of energy for each prosumer;
  generate a minimum total amount of energy, the generation of the minimum total amount of energy comprising a sum of the minimum amounts of energy for each prosumer;
  generate an energy ratio, the generation of the energy ratio comprising a product of the maximum total amount of energy and a reciprocal of the minimum total amount of energy;
  generate an intermediate value per prosumer, the generation of the intermediate value per prosumer comprising a difference of a product of the energy ratio and the respective minimum amount of energy from the respective maximum amount of energy; and
  generate the respective amount of energy per prosumer, the generation of the respective amount of energy per prosumer comprising a product of the respective intermediate value and a reciprocal of a subtraction of the energy ratio from a value of one, such that:
    a relative position of the respective amount of energy is produced within an interval, defined by the minimum amount of energy and the maximum amount of energy, of the respective prosumer such that the relative positions of each of the prosumers have an identical value; and
    a sum of the respective amounts of energy for each prosumer yields a value of zero.

14. The device of claim 13, wherein the allocation of the amounts of energy is respectively carried out for a future time interval.

15. The device of claim 14, wherein a length of the future time interval is set equidistantly.

16. The device of claim 14, wherein a length of the future time interval is set such that in the case of an increase in a difference between the maximum total amount of energy and the minimum total amount of energy of a current time interval and a difference between the maximum total amount of energy and the minimum total amount of energy of a time interval earlier than the current time interval, the length of the future time interval is dynamically adapted by a comparison of the length of the current time interval.

* * * * *